United States Patent [19]

Jarmul

[11] 4,248,291

[45] Feb. 3, 1981

[54] COMPACT THERMAL ENERGY RESERVOIRS

[76] Inventor: Seymour Jarmul, 96 Windsor Gate Dr., North Hills, N.Y. 11040

[21] Appl. No.: 952,293

[22] Filed: Oct. 18, 1978

[51] Int. Cl.³ .............................................. F28D 17/00
[52] U.S. Cl. ......................................... 165/4; 165/10; 165/104 S; 62/430; 62/59; 126/436; 219/378; 219/325
[58] Field of Search .................... 165/104 S, 10, 4; 126/430, 400, 436; 62/430, 425, 437, 435, 530; 219/378, 325

[56] References Cited

U.S. PATENT DOCUMENTS

| | | | |
|---|---|---|---|
| 2,528,449 | 10/1950 | Norton | 62/530 X |
| 2,803,115 | 8/1957 | Shepherd | 62/530 |
| 2,989,856 | 6/1961 | Telkes | 62/530 X |
| 3,532,856 | 10/1970 | Collins | 219/378 X |
| 3,780,537 | 12/1973 | Spencer | 62/530 |
| 4,099,558 | 6/1978 | Bricard et al. | 165/104 S |
| 4,174,598 | 11/1979 | Shepherd et al. | 62/530 X |

Primary Examiner—Albert W. Davis
Attorney, Agent, or Firm—Fitzpatrick, Cella, Harper & Scinto

[57] ABSTRACT

Light weight, compact and efficient thermal energy reservoirs are described in which thin layers of a heat storage material, such as an inorganic salt having a high latent heat of fusion, are heated or cooled by an intermittent primary energy source, such as solar or off-peak electric power. The stored energy is utilized during periods when the primary energy source is not available. The heat storage material is contained in flat fluid tight packages, such as a heat sealed polyethylene film bag, which can readily be removed and replaced through removable panels or doors in the insulated reservoir enclosure.

5 Claims, 8 Drawing Figures

COMPACT THERMAL ENERGY RESERVOIRS

BACKGROUND OF THE INVENTION

1. Field of the Invention

This invention relates generally to apparatus for absorbing, storing and releasing thermal energy. More particularly, it is directed to compact light weight apparatus which is suitable for thermal energy storage at the location of demand, such as within a room of a private dwelling, and which can meet that demand utilizing an intermittent primary energy input.

2. Prior Art

Heat storage reservoirs are known and have been applied to the storage within a dwelling of thermal energy from an intermittent primary energy source, such as solar heat, and to the recovery of that stored energy during periods when the primary energy source is unavailable. Such reservoirs likewise have been utilized to reduce the cost of the primary energy, such as by employing electricity as the primary energy source only during off-peak hours; i.e., during periods of low demand when reduced rates are in effect. Among the more widely used energy storage materials are water, rocks and gravel, which store energy as sensible heat. Because of the great weight of the necessary quantities of such materials, it has not been possible to locate them in or near the living rooms of the dwelling which require the stored energy. Typically, these storage materials have been employed in a central bulk storage system which is located in the basement and which has heat exchange tubes coiled thru the mass of such material with pipe or duct connections to both the primary energy source and to each of the rooms. Since the stored energy demand is not usually in the basement, a great deal of insulation is required to prevent unwanted losses to the basement air. The cost of installing such system in a new structure is extremely high and is prohibitive when retrofitting an existing structure.

The volume and weight of a central thermal energy reservoir for a private dwelling may be greatly reduced by using for energy storage materials having a high latent heat of fusion, such as those described in U.S. Pat. Nos. 2,677,243, 2,856,506 and 3,320,408. While an improvement over the use of water or stone, these systems also are not entirely satisfactory. Suitable heat of fusion salts are often rather corrosive to the heat exchange tubes which coil through the mass of salt, and their low thermal conductivity makes it necessary to use a much larger than theoretical quantity of salt in a system which cycles within a 24 hour period. In addition, these salts have a limited useful life, and replacement (by pumping when hot and liquid or by chopping and shoveling when cold and solid) is costly, dirty and requires a lengthy shutdown of the entire heating or cooling system.

SUMMARY

It is an object of this invention to provide a light weight compact and efficient thermal energy reservoir. A further object of this invention is to provide a thermal energy reservoir which utilizes the latent heat of fusion of a heat storage material, which extends the useful life of such material and in which such material can quickly and cleanly be replaced. It is a specific object of this invention to provide such thermal energy reservoir which is suitable for space heating or cooling an individual dwelling size room or for heating water, and which enables the user to enjoy a relatively uniform level of heating or cooling utilizing an intermittent primary energy source, such as solar energy or off-peak electric power.

It has been found that these objects and other advantages, which will be apparent from a consideration of this specification, can be achieved by the use of a thermal energy reservoir of this invention.

Broadly, my invention is a thermal energy reservoir comprising (a) a plurality of parallel spaced layers of heat storage material which is enclosed in multiple flat fluidtight packages, (b) at least one heat exchange fluid conduit separating each said layer from each adjacent layer, said conduit having an inlet and a remotely positioned outlet and (c) a thermally insulated enclosure for said layers and conduits having at least one opening, which provides access to said fluid-tight packages of heat storage material, and a closure for said opening.

Figure 1:
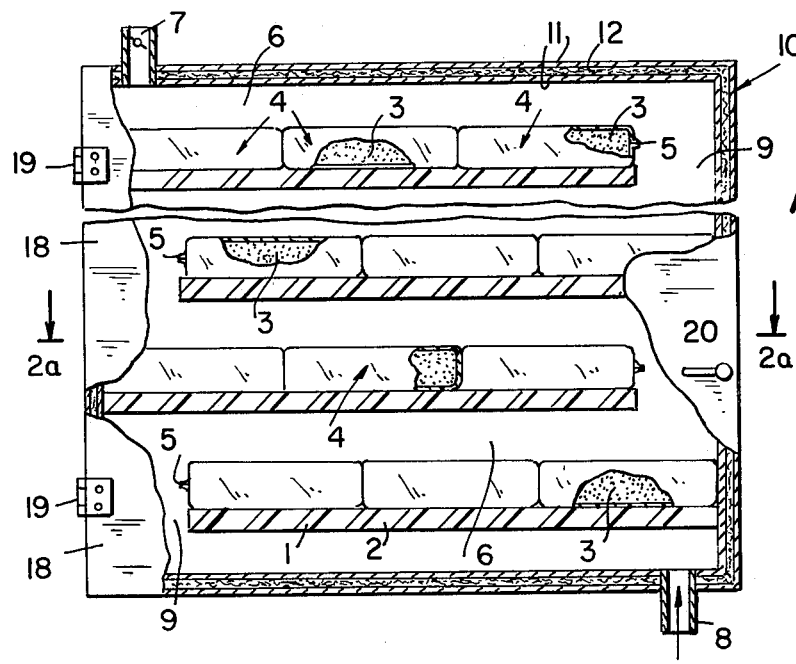
FIG. 1 is a schematic representation of a front view, partially in section, of a compact energy reservoir constituting an embodiment of this invention.
Figure 3:
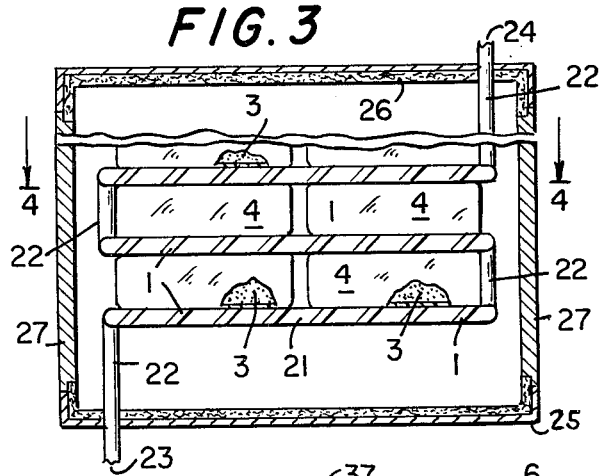
FIG. 3 is a schematic cross section of another embodiment of this invention.
Figure 5:
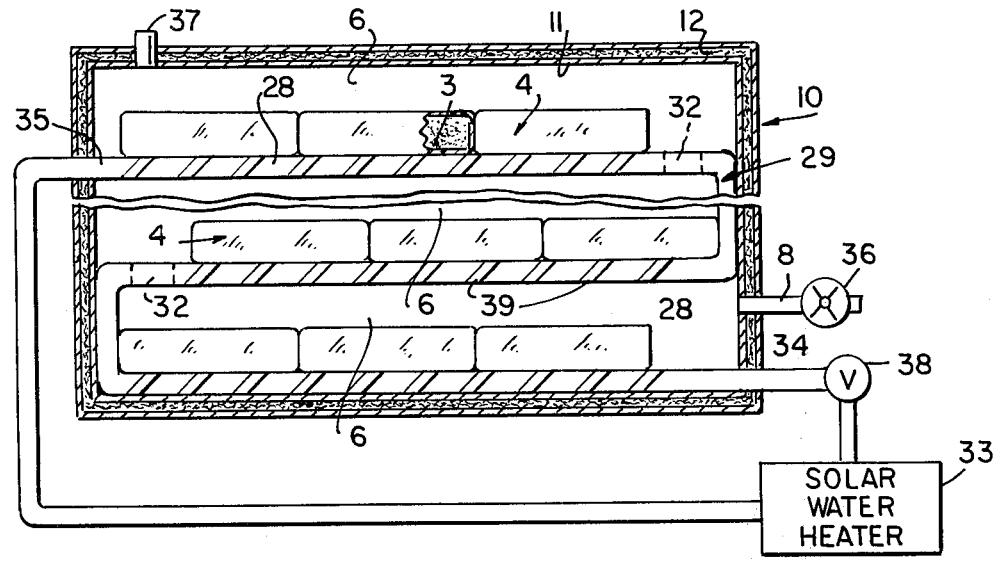
FIG. 5 is a schematic cross section of still another embodiment of the invention.

The reservoirs of FIGS. 1 and 5 represent space heaters or coolers. The reservoir of FIG. 3 illustrates a water heater.

DETAILED DESCRIPTION OF THE INVENTION

The heat storage materials which are used in the energy reservoirs of this invention may be any of a wide variety of known substances which are capable of storing significant amounts of thermal energy through phase change or chemical reaction. Materials that are particularly well suited for use are inorganic salts which have a high latent heat of fusion (i.e., from about 60 to about 120 BTU's per pound or higher) and a melting point between the freezing and boiling points of water. A preferred group of such heat of fusion salts for heating applications are the inorganic salt hydrates that melt above room temperature (72° F.), and particularly those melting between about 80° F. and about 120° F. Exemplary of these high melting point salts are calcium chloride hexahydrate, sodium carbonate decahydrate, sodium sulfate decahydrate, disodium phosphate dodecahydrate and sodium thiosulfate pentahydrate.

For cooling applications, it is preferred to employ inorganic salt hydrates that melt below room temperature, and particularly those melting between about 45° F. and about 65° F. Examples of such low melting point salts include potassium fluoride tetrahydrate and eutectic mixtures of sodium sulfate decahydrate with sodium, potassium or ammonium chloride. Typical of such low melting point eutectic mixtures is a formulation that melts at 55° F. and contains:

sodium sulfate decahydrate: 70 wt. %
sodium chloride: 11 wt. %
ammonium chloride: 10 wt. %
silica gel: 6 wt. %
borax: 3 wt. %.

Because of the fact that the individual salts in a low melting eutectic mixture have melting points that are considerably higher than that of the mixture and may be too high for cooling usage, it is highly desirable that a thickening agent, such as the silica gel of the above formulation, be present to minimize the propensity of one or more salt to separate out of such eutectic mixture after a number of fusion cycles. It also is desirable to include in low melting eutectic mixtures a nucleating agent, such as the borax shown above, to reduce the frequency of supercooling of the liquid solution of salts. These additives also may be employed with individual hydrates to suppress both supercooling and the settling out, during crystallization, of lower water content hydrates.

Since salts typically exhibit relatively low thermal conductivity, heat exchange efficiency is enhanced by using them in layers of one inch or less in thickness. Preferably, the layers are less than about ¾ inch, and more preferably, less than about ½ inch, as the use of such thin layers significantly increases the useful life of inorganic salt hydrates, particularly the low melting eutectic mixtures. While layers of less than about ⅛ inch in thickness result in excellent heat exchange efficiency, as well as long salt life, the use of such extremely thin layers reduces the ratio of heat storage material weight to total reservoir weight and may not be practical where total reservoir weight is a limiting factor.

The layers of heat storage material, as well as the fluid conduits separating the layers, are preferably positioned horizontally, with the layers conveniently being supported by horizontal rectangular shelves.

The heat storage material may be enclosed in any flat, fluid tight package that has sufficient strength to withstand handling, as when replacing exhausted heat storage material. Because of their high strength, low weight and corrosion resistance, plastic packages are generally more suitable than metal or ceramic. While rigid engineering plastics, such as ABS, may advantageously be employed in a self-supporting package, in reservoir designs employing horizontal shelves and inorganic heat of fusion salts, it is preferred to enclose the salts in heat-sealed bags made of plastic film, such as polyethylene or polypropylene. Advantageously, these bags are rectangular and cover a major portion of each shelf.

The numerous advantages of the thermal energy reservoir of this invention will be apparent from an examination of the following preferred embodiments.

Referring again to FIG. 1, there is shown a particularly simple, light weight and compact embodiment of the invention which requires no plumbing connections, which can be designed to fit conveniently beneath the window of a room and which can provide the daily heating requirements of that room utilizing primarily off-peak electric power. During off-peak periods, such as at night, current is passed through electric resistance heating tape 1, which is wound around elongated rectangular shelves 2, and the resultant heating melts a high melting point fusion salt 3, such as disodium phosphate dodecahydrate which melts at 97° F. This salt is enclosed in rectangular polyethylene film bags 4, each of which has been filled and the open end heat sealed 5, so that when placed on its side, the salt thickness is from about one quarter to about three quarters of an inch. The air in the rectangular conduits 6 also is heated at this time and may be retained in the energy reservoir by closing movable louver 7 or it may be allowed to rise into the room by convection by opening this louver.

Before the onset of peak power requirements, electrical heating is terminated. When stored heat subsequently is required in the room, the opening of louver 7 permits hot air in conduits 6 to escape by convection. This heated air is replaced by cool room air which enters through port 8 and is itself heated by the solidification of fusion salts 3 as it passes successively through the conduits 6 via connecting channels 9.

In this embodiment, the rectangular conduits 6 are bounded front and back and at both ends by an enclosing shell 10, which is made of glass fiber reinforced polyester resin sheets 11 sandwiching polyurethane foam insulation 12. Top and bottom bounds are provided by adjacent shelves 2 which abut the shell 10. Suitable aluminum shelf designs are shown in FIGS. 2a through 2c.

Figure 2A:
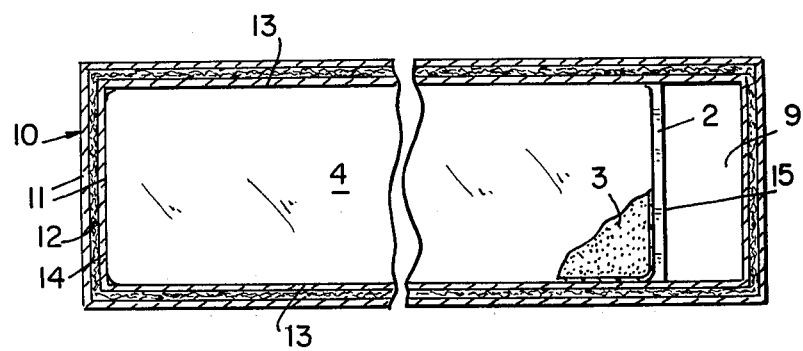
FIGS. 2a, 2b and 2c are schematic plan sections along line 2a—2a of FIG. 1 showing different shelf designs which are suitable for use in the reservoir of FIG. 1.

The FIG. 2a shelf 2 is solid (i.e., it is fluid impermeable) and it abuts the shell 10 at its two long edges 13 and at one end 14. The other end 15 does not reach the shell 10, thus providing a connecting channel 9 for fluid communication between adjacent conduits. The FIG. 2b shelf 2, which abuts the shell 10 at all four edges 16, also is solid except for an opening 9 near one end which provides a channel for fluid communication between adjacent conduits.

Figure 2B:
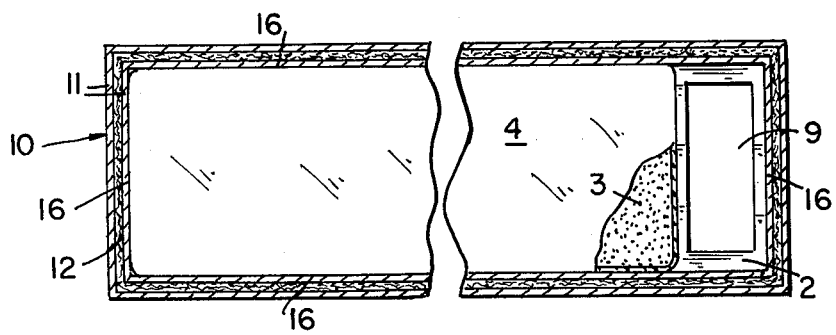
Figure 2C:
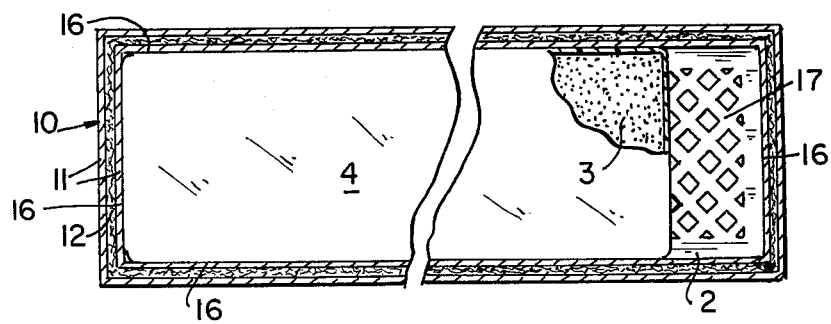

A particularly lightweight shelf 2, shown in FIG. 2c, is an expanded metal lattice which abuts the shell 10 at all four edges 16. Fluid communication between adjacent conduits (i.e., fluid flow thru the shelf) is limited to a channel formed by the lattice openings 17 at one end of the shelf which are not covered by a polyethylene bag 4 of fusion salt 3.

In each of FIGS. 2a thru 2c, the channels on adjacent shelves are at opposite ends so as to provide the heat exchange benefits of fluid movement in opposite directions in adjacent conduits. Advantageously, these channels are sized to offer no greater resistance to fluid flow than the conduits. The conduits, which have planar dimensions roughly equal to those of the shelves, may be of any convenient height, but advantageously are about one fourth to about three fourths the thickness of the fusion salt layer. Further reduction in the height of the conduits reduces the overall size of the reservoir, but may restrict convective fluid movement and require the use of a fluid pump.

In the embodiment of FIG. 1, the front face panel 18 of the shell 10 is hinged at one edge 19 and locked to the shell by a latch 20 at the opposite edge, thereby providing a convenient means of access to bags 4 of fusion salt 3. While the use of thin layers of fusion salt has been found to enhance the useful life of the salt, it does deteriorate and occasional replacement is necessary. The hinged panel of the FIG. 1 embodiment provides a convenient means of quickly and cleanly replacing bags of exhausted fusion salt, which rest on, but are unattached to the shelves. It also enables one to easily convert the reservoir from heating to cooling storage. For example, by using a low melting fusion salt, such as a eutectic mixture of sodium sulfate decahydrate with sodium or ammonium chloride, one can store cooling during electric off-peak hours by introducing refrigerated air in port 8 and thru the conduits 6 to solidify the eutectic mixture. During peak hours, room cooling can be provided by melting the eutectic mixture by passing warm room air thru the conduits 6, either by opening louver 7 and permitting it, as it is cooled, to flow out port 8 by convection or, preferably, by forcing the room air into port 8 by a fan (not shown), thru conduits 6 and out louver 7. The simultaneous use of both high and low melting salts, either in separate bags or, when compatible, in the same bag, can provide the flexibility to employ the FIG. 1 reservoir for both cooling and heating without seasonal changing of bags. Such simultaneous use of high and low melting salts would utilize the sensible heat of both salts, but only the heat of fusion of one, when either heating or cooling the room. At constant salt volume, both heating and cooling capacity therefore would be somewhat diminished.

A thermal energy reservoir of this invention as illustrated in FIG. 1, which contains fifty shelves that are eighty two inches long and twelve inches deep and are spaced five eighths inch apart can hold about ten and one half cubic feet of fusion salt with a salt layer thickness of three eighth inch. When using disodium phosphate dodecahydrate (density about 95 pounds per cubic foot and heat of fusion of about 114 BTUs per pound) as the fusion salt, the salt weight is about 1000 pounds and the theoretical energy storage capacity as heat of fusion is about 114,000 BTUs. In most temperate climate zones, this heat storage capacity in an average size room in a private dwelling is adequate to permit use of only off-peak electric power on all but the most severe winter days. The overall dimensions of such reservoir need be no larger than about 7 feet long by 14 inches deep by 3 feet high with a total weight of no more than about 1250 pounds, thus creating a structural load of only about 155 pounds per square foot. When such reservoir is located at an external wall, for example beneath a window, only about 8.2 square feet of floor space is required and the structural considerations are primarily those of shear and crushing rather than bending or deflection. This places it well within the structural load limits of conventional wood frame houses. Such reservoir therefore is uniquely suited both for installation in new housing and in retrofitting existing structures.

While no automation is shown in the illustration of FIG. 1, it will be apparent that this and other embodiments of this invention can be adapted readily to time and temperature responsive automatic controls. For example opening and closing of the louver 7 or the activation of a fan (not shown) to force air thru the conduits can be effected by a relay that is activated by a room thermostat. Similarly, electric current flow thru heating tape 1 can be controlled conveniently by a time switch, either alone or in series with a thermostat which responds to the air temperature at louver 7 and which is set to open at a temperature slightly higher than the melting point of the fusion salt.

Figure 4:
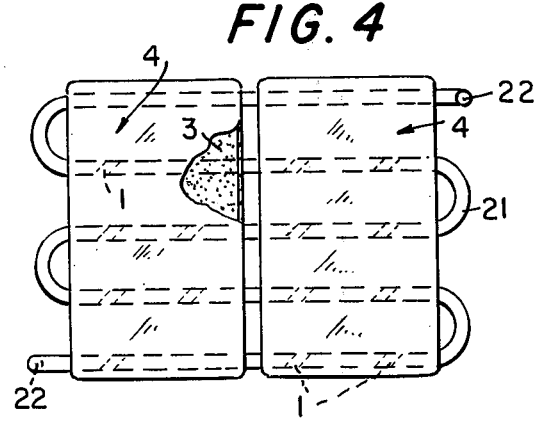
FIG. 4 is a schematic plan section along line 4—4 of FIG. 3 showing a conduit containing shelf in the reservoir of FIG. 3.

The embodiment of FIG. 3 represents a simple, compact electric water heater that is designed to operate primarily on off-peak power. Heat sealed rectangular polyvinyl chloride film bags 4, each of which contains a half inch thick layer of a high melting point fusion salt 3, such as sodium thiosulfate pentahydrate, are supported by horizontally coiled shelf sections 21 of a continuous copper tube. The continuous copper tube consists of alternating horizontally coiled shelf sections 21 and vertical riser sections 22. An insulated electric resistance heating element 1 is wound around the shelf sections 21. FIG. 4 illustrates one such horizontally coiled shelf section.

Cold water enters this water heater through lower end 23 of the continuous tube and, during off-peak hours, is heated electrically and withdrawn on demand through the upper end 24 of the tube. This off-peak electric heating also melts the salt 3. During peak electric hours, heating is stopped and cold water entering the tube is warmed by the fusion salts 3 as they solidify, as well as by the sensible heat of the tube and salts. Heat losses are minimized by sheet iron enclosure 25 which has internal glass fiber insulation 26 and removable side panels 27 which provide access to bags 4.

Figure 6:
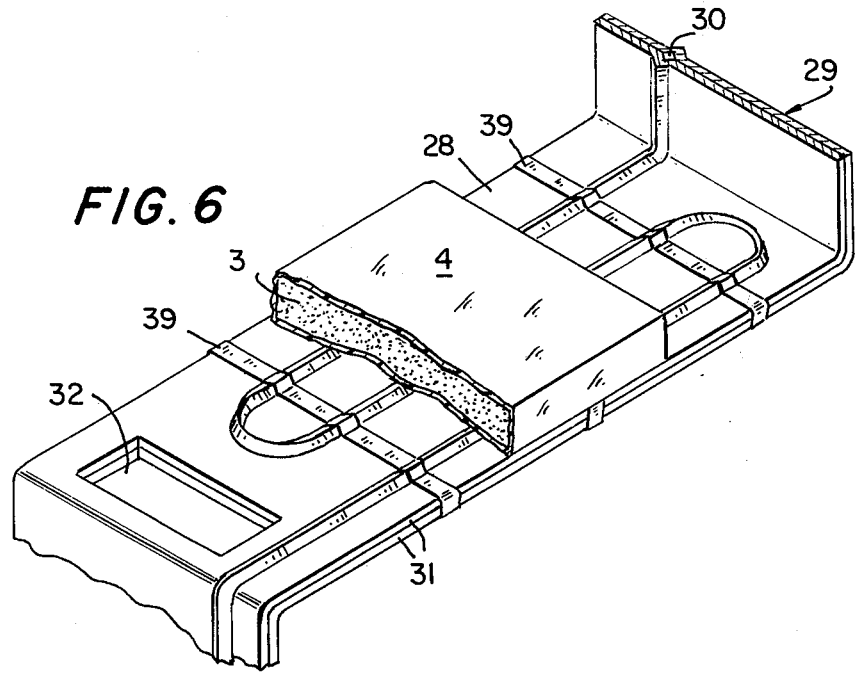
FIG. 6 is a schematic perspective view of a conduit containing shelf in the reservoir of FIG. 5.

FIG. 5 illustrates a compact thermal energy reservoir that is adapted for space heating using a hot liquid primary energy source, such as a solar water heater. The enclosure 10 with a hinged front panel (not shown) and the heat sealed polyethylene bags 4 containing fusion salts 3 are as described in FIG. 1. Horizontally elongated rectangular shelves to support the bags 4 are provided by horizontal segments 28 of a vertical coil of bonded aluminum sheet 29 which, as shown in FIG. 6, contains a continuous duct 30 between the bonded layers 31. Such structures are used commonly to convey circulating refrigerant in household refrigerators. The vertical coil of bonded aluminum sheet 29 abuts the front, back and both sides of enclosure 10, thereby forming air conduits 6. Channels for air passage between adjacent conduits are provided by openings 32 at one end of each shelf portion 28 of the bonded aluminum sheet 29, the openings on each shelf portion being at an end opposite the openings on each adjacent shelf.

During daylight hours, hot water from a solar heater 33 enters the lower end 34 of duct 30, heating both the air in the conduits 6 and the fusion salts 3. The water then returns to the solar heater 33 thru the upper end 35 of duct 30. Air enters the bottom air conduit thru port 8, circulates thru all the conduits and exits into the room thru vent 37. Air movement may be by convection alone, but advantageously is augmented by a thermostatically controlled fan 36. During the night or other periods when solar energy is inadequate for room heating, water circulation is cut off at valve 38 and the air passing thru conduits 6 is heated by the crystalizing salts 3 and the sensible heat of the bonded aluminum sheet 29. In order to provide for adequate room heating during periods of extended cloudiness or extreme cold, it is advantageous to have available a supplementary heat source, such as an insulated electric resistance heating element 39 attached to the shelf portion 28 of bonded aluminum sheet 29, as shown in FIG. 6.

It will, of course, be understood that various additions and modifications may be made in the embodiments of this invention described above without departing from the spirit and scope of the invention as defined in the claims below.

The embodiments of the invention in which an exclusive property or privilege is claimed are defined as follows:

1. Compact thermal energy reservoir comprising:
   (a) an enclosure having at least one opening which provides access therein and a closure for said opening;
   (b) a plurality of adjacent, elongated mesh shelves within said enclosure, all edges of which abut said enclosure and;
   (c) a plurality of layers of heat storage material, each layer supported by one of said shelves and comprising at least one flat, fluid-tight package containing an inorganic salt melting between about 32° F. and about 212° F., each of said shelves being made essentially impermeable to fluid over a major portion of its area by one or more of said flat, fluid-tight packages of salt, the entire fluid permeable area being at an end of said shelf which is opposite the fluid permeable end of each adjacent shelf, wherein adjacent shelves and said enclosure form a single fluid conduit separating each layer, each conduit being in fluid communication with each adjacent conduit.

2. Reservoir of claim 1 wherein at least one said shelf includes electrical heatings means.

3. Reservoir of claim 1 wherein said heat storage material has a melting point between about 45° F. and about 65° F.

4. Reservoir of claim 1 wherein said heat storage material has a melting point between about 80° F. and about 120° F.

5. Compact thermal energy reservoir comprising:
 (a) an enclosure having at least one opening which provides access therein and a closure for said opening,
 (b) a plurality of adjacent elongated shelves within said enclosure, all edges of which abut of said enclosure,
 (c) a plurality of layers of heat storage material, each layer comprising at least one flat, fluid-tight package containing an inorganic salt melting between about 32° F. and about 212° F., each of said layers being disposed over a major portion of the area of each of said shelves, whereby said shelves are essentially impermeable to fluid in correspondence to said layers, each shelf having a fluid permeable area being entirely at an end of said shelf which is opposite the fluid permeable end of each adjacent shelf, wherein adjacent shelves and said enclosure form a single fluid conduit separating each layer, each conduit in fluid communication with each adjacent conduit.

* * * * *